July 21, 1942.   P. J. HOWE ET AL   2,290,750
ILLUMINATED CLOCK
Filed Dec. 10, 1938   3 Sheets-Sheet 1

INVENTORS
P. J. HOWE
C. H. WYSS, JR.
BY
ATTORNEY

July 21, 1942. P. J. HOWE ET AL 2,290,750
ILLUMINATED CLOCK
Filed Dec. 10, 1938 3 Sheets-Sheet 2
FIG. 3
FIG. 4
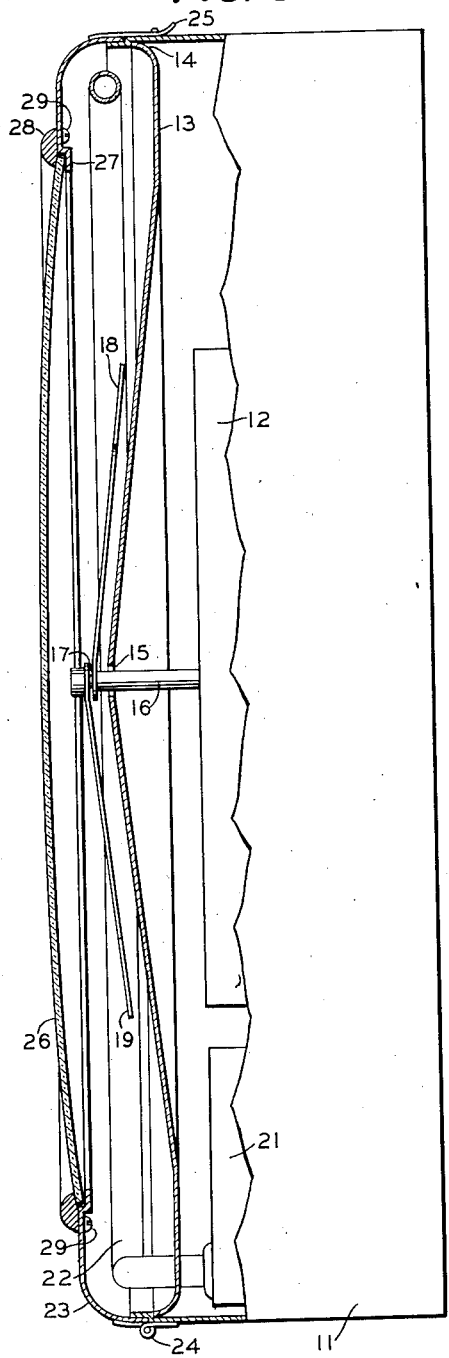
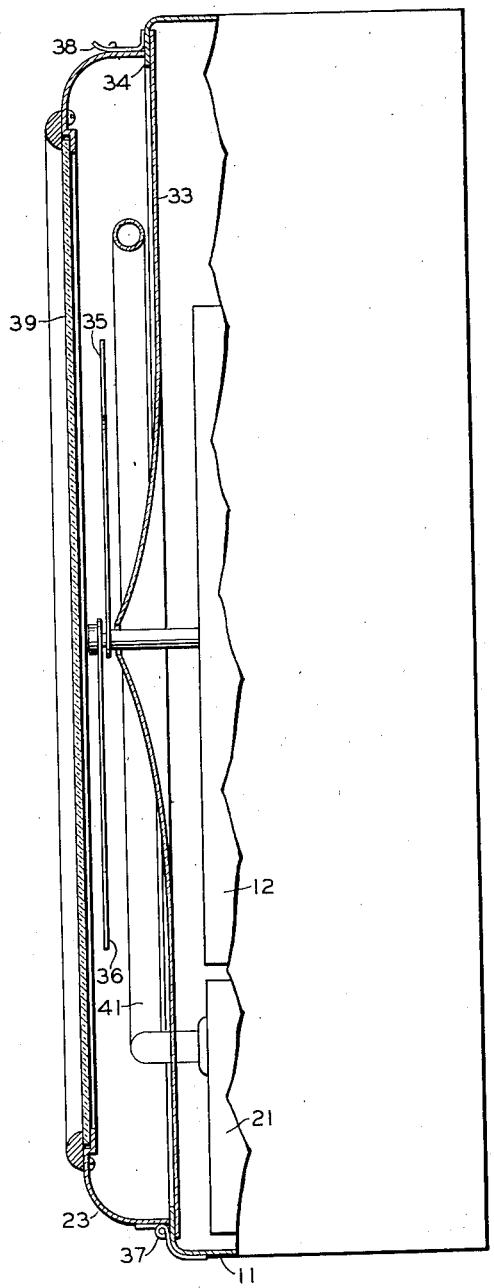
INVENTORS
P. J. HOWE
C. H. WYSS, JR.
BY *W. K. Sponagle*
ATTORNEY July 21, 1942.  P. J. HOWE ET AL  2,290,750
ILLUMINATED CLOCK
Filed Dec. 10, 1938   3 Sheets-Sheet 3

INVENTORS
P. J. HOWE
C. H. WYSS, JR.
BY
ATTORNEY

Patented July 21, 1942

2,290,750

UNITED STATES PATENT OFFICE 2,290,750

ILLUMINATED CLOCK

Paul J. Howe, Ridgewood, N. J., and Clement H. Wyss, Jr., New York, N. Y., assignors to The Western Union Telegraph Company, New York, N. Y., a corporation of New York Application December 10, 1938, Serial No. 244,904

4 Claims. (Cl. 240—2.1)

This invention relates to the illumination of indicating devices and has particular reference to the illumination of the dial of a clock wherein the space available for such purpose is comparatively small.

One of the objects of the instant invention is to provide compactly arranged instrumentalities for uniformly illuminating the relatively large surface area of the dial of an indicating device.

Another object of this invention is to provide means disposed within the structure of an indicating device for uniformly illuminating the dial thereof in such a manner that the indicia inscribed thereon and the indicating means are, or appear to be, silhouetted.

Another object of this invention is to provide means confined to a relatively small space within the structure of an indicating device for uniformly illuminating the dial thereof in such a manner that it may be viewed from substantially any angle without observing any objectionable reflection or high light therefrom.

A further object of the invention is to provide a means for attaining the foregoing objects without having the source of light visible to the eye of an observer and yet rendering the dial as legible at night as it is in the daytime.

In its broadest aspect this invention attains the objects hereinbefore stated by means of an annular source of light disposed adjacent that portion of the dial on which are inscribed the indicia. Mounted in back of the indicating hand, or hands, is a light reflective surface having a configuration which is non-planar and which is designed to intercept the maximum number of rays of light and to redirect them, evenly distributed, toward the front of the device. The indicia may be inscribed either on the light reflective surface or on a translucent member located toward the front of the indicating device.

A clock has been selected as the indicating device for the purpose of illustrating the invention but it is obvious that this invention may be used with equal facility with any other type of indicating device. Accordingly, the following description is taken with reference to the accompanying drawings which are to be considered merely as illustrative and in which similar reference characters designate similar parts in the respective views.

Fig. 3 is a side elevation, partially in section, of the clock shown in Fig. 1;

Fig. 4 is a side elevation, partially in section, of the clock shown in Fig. 2;

Figure 1:
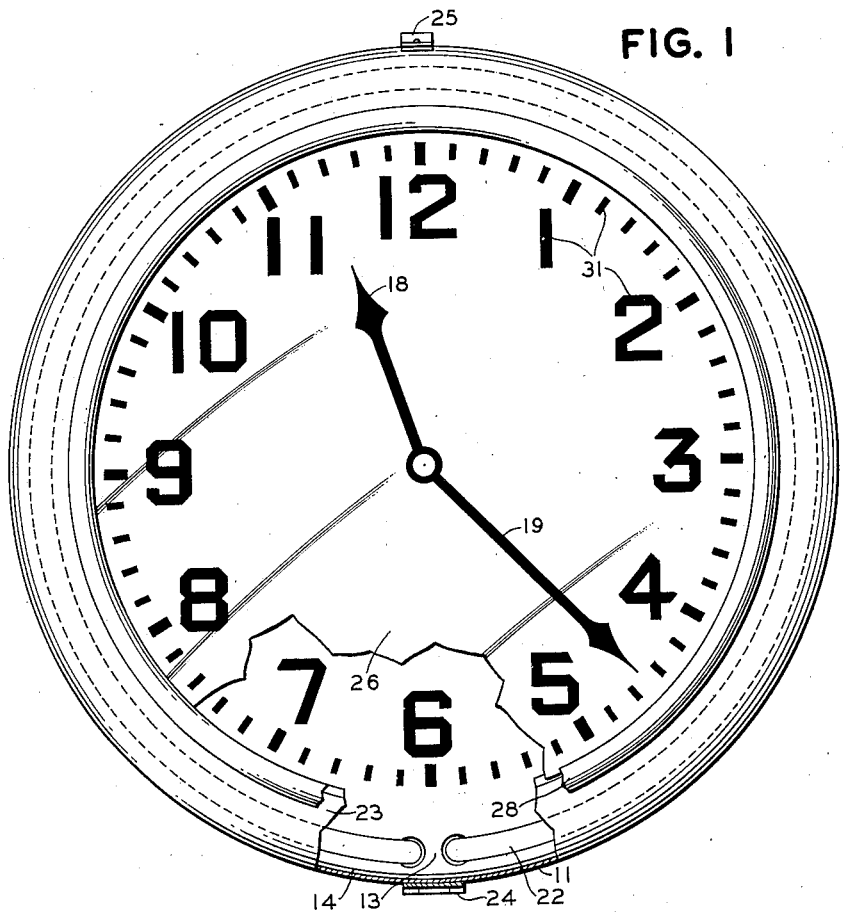
Fig. 1 is a face view of a clock having an annular source of light and having the indicia inscribed directly upon a conical light reflective member.

Having reference first to Figs. 1 and 3, the supporting structure or case of a clock is represented by the character 11. The mechanism 12 for operating the clock is mounted toward the rear of the case 11. Forwardly spaced from the clock mechanism 12 is a light reflective surface 13 which is provided at its outer extremity with a flange 14 which may be welded, riveted or affixed to the case 11 in any conventional manner. The reflective member 13 is generally circular in shape and is characterized at the central portion thereof by a conical configuration having its apex 15 disposed at the center of the clock face. Extending forwardly from the clock mechanism 12 and through an opening in the reflective surface 13 adjacent the apex 15 are two concentrically arranged shafts 16 and 17 which carry at their extremities, the indicating hands 18 and 19 respectively. It will be noted that in this embodiment the hands are bent rearwardly in such a manner that they lie parallel to the conical surface of the reflective member 13.

Mounted toward one side and at the rear of the case 11 is a container 21 in which may be located a transformer or other electrical equipment necessary for the operation of a tubular source of light such as a neon or other gas filled device. In this invention the annular illuminating device 22 in its preferred form is that which is known as fluorescent tubing. It is obvious that the present invention is not limited to any specific type of luminous tubing and may comprise tubing filled with any one of a number of known gases used for the purpose of producing different color effects. The fluorescent tubing which is the preferred form is chosen for the reason that it produces a higher intensity of light than some of the other forms. The fluorescent tubing 22 is disposed so that it encircles substantially all of the dial of the clock. In this modification it is also located close to the outside of the clock case 11.

An annular bezel 23 is mounted at the front of the clock and is supported at the bottom by a hinge 24 and at the top by a clasp or fastener 25. Set in this bezel is a crystal 26 which is retained by means of an annular offset 27 formed in the bezel 23 and by an annular bead member 28 which is secured to the bezel 23 by means of screws 29.

Being located directly behind the bezel 23, the source of illumination 22 is concealed from the view of an observer. The major portion of the light emanating from the source 22 is directed toward the reflective surface 13 where, because of its conical configuration, the light is redirected so that it passes out the front of the clock evenly distributed over the face thereof. The time indicating indicia 31 are inscribed in black or other dark contrasting color around the outside of the conical portion of the reflective surface 13. It will be noted that the light emanating from the source 22 falls directly upon the outside surfaces of the hands 18 and 19 which, preferably, are colored black and therefore are non-reflective. The effect of such illumination, when the clock is viewed from the front, is that the hands and the indicia appear to be silhouetted against a uniformly illuminated background. As noted above this background may be colored according to the type of illuminating device used. It will be noted that all of the light which meets the eye of an observer is reflected from the surface 13 and viewed through the clear crystal 26.

Figure 5:
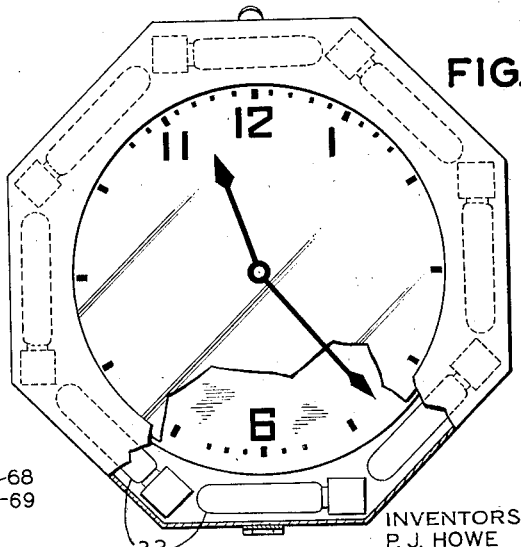
Fig. 5 is a face view, partially broken away, of a clock similar to that of Fig. 1 having a plurality of concentrated sources of light disposed about the dial.

In carrying out this invention it is not necessary that the light source be in the form of a continuous tubing. Obviously the source of light may comprise a plurality of sections of luminous tubing arranged in such a manner that continuity is simulated. Also by having reference to Fig. 5 it may be seen that the source of light may comprise a plurality of concentrated light sources such as the lamps 32. This manner of illuminating the dial of a clock may be found to be particularly suitable where the clock has a shape other than round, such as the octagonal form shown in Fig. 5.

Figure 2:
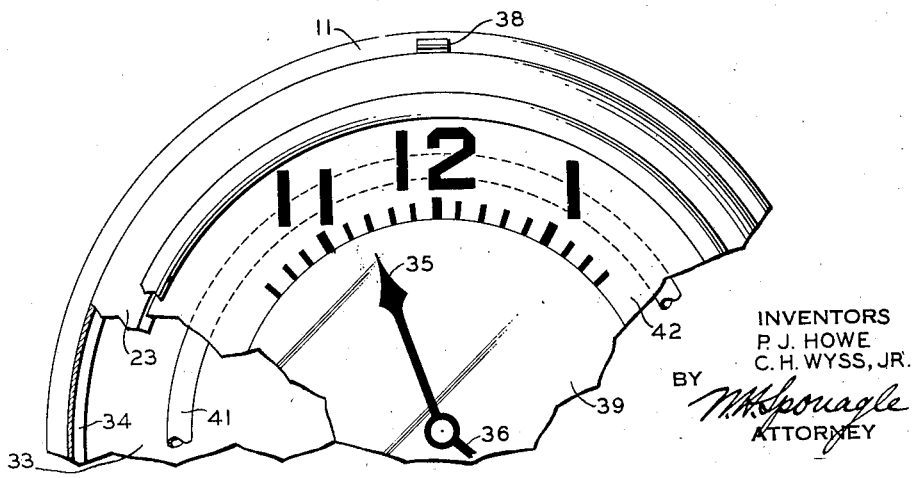
Fig. 2 is a partial face view of a clock similar to that of Fig. 1 in which an annular source of light is disposed behind a translucent member bearing the indicia.

Having reference to Figs. 2 and 4, another modification of an illuminated clock is shown. In this case the light reflective surface 33 has a shape which is generally conical, but one in which radial elements follow a curved path substantially parabolic. Such a reflective surface is shown affixed adjacent its periphery to an annular flange or lip 34 formed on the clock case 11. The hands 35 and 36 are straight and disposed in planes parallel to the front surface of the clock. The front of the clock is enclosed by a cover comprising a frame or bezel 23 supported by a hinge 37 and by a clasp 38, and a glass or other suitable crystal 39 mounted in the bezel 23. An annular source of white or other suitably colored light 41 is mounted in a plane parallel to the front of the clock and is disposed adjacent the reflective surface 33.

The crystal 39 is provided with a central portion which is clear or transparent and a translucent circular band 42 adjacent its periphery. The band 42 may be provided with any suitable color, which may or may not be different from that of the source 41, and has inscribed thereon in black or in other contrasting color the time indicating numerals or indicia. It will be noted that the light source 41 is disposed directly behind the translucent band 42 which prevents the source of light from being observed.

To one viewing the clock from the front the effect of this type of illumination is that the numerals are silhouetted against the translucent background formed by the band 42, while the central portion of the dial appears in a color derived from the light source 41 which is distinctive from that of the band 42, and the hands 35 and 36 stand out in relief against this central portion. Because of the peculiar shape of the light reflective surface 33 there is a uniform illumination of the respective areas of the crystal 39 with an absence of objectionable reflections or highlights irrespective of the angle from which the clock is viewed. The light which is visible to an observer to produce these effects is a combination comprised partly of transmitted light and partly of reflected light.

Figure 7:
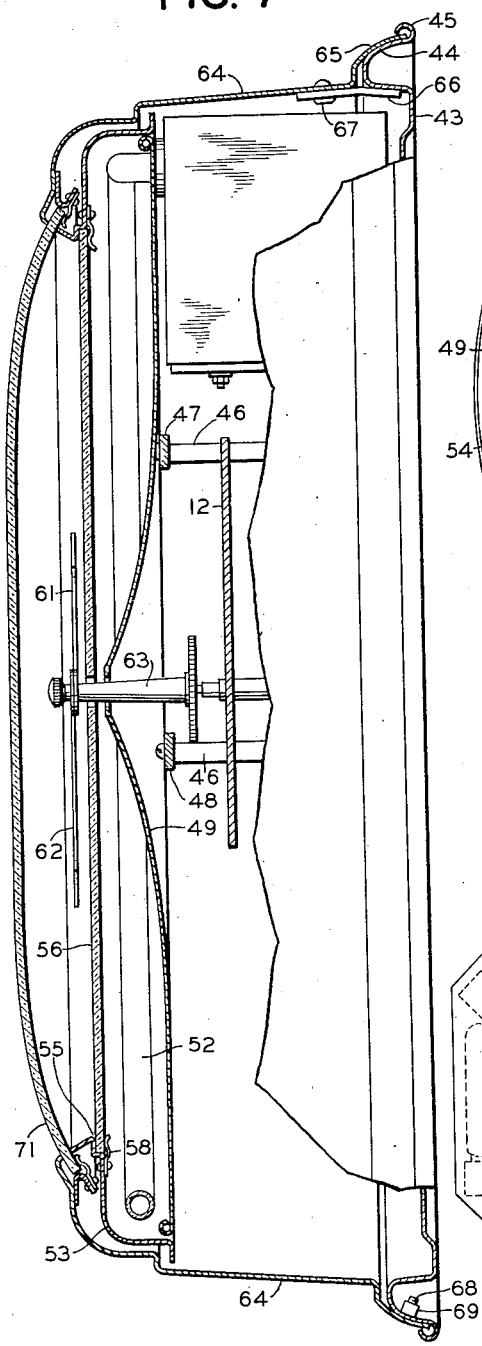
Fig. 7 is a side elevation, partially in section, of the clock shown in Fig. 6.
Figure 6:
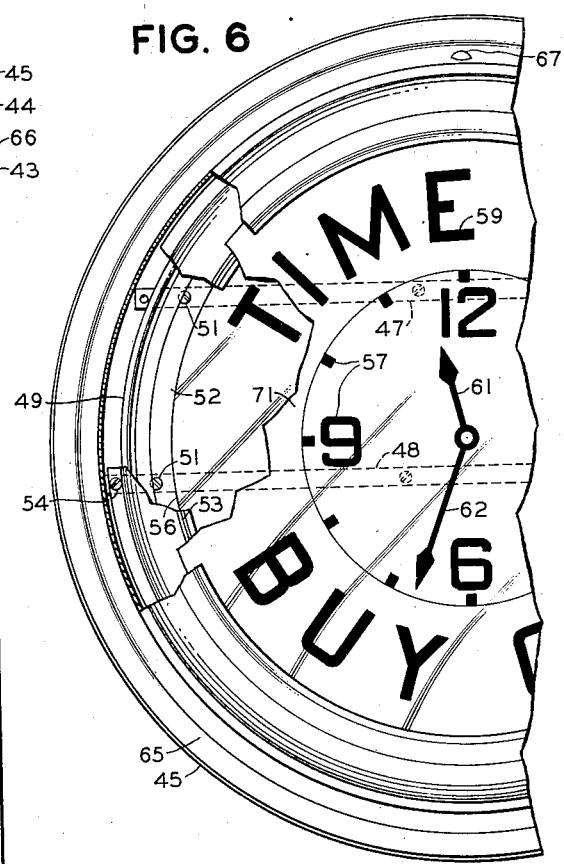
Fig. 6 is a partial face view of a clock provided with a weatherproof casing and embodying the invention.

Another modification of the invention is shown in Figs. 6 and 7. The clock mechanism and the various instrumentalities employed for lighting the face of the clock are mounted on a back plate 43, which has formed thereon an annular extension 44 terminating in a beaded portion 45. It will be noted that the rolled or beaded portion 45 is provided with a small opening facing toward the front of the clock. A plurality of studs 46 extend forwardly of the clock mechanism 12. To horizontal bars 47 and 48 are affixed by suitable screws to the ends of the studs 46 and extend across the major portion of the clock. A light reflective member 49 having a configuration similar to member 33 of Fig. 4 is mounted by means of a plurality of screws 51 on the bars 47 and 48 adjacent the ends thereof. A circular source of light such as a length of luminescent tubing 52 is mounted forwardly of the reflective member 49 in such a manner that it is disposed adjacent the outer extremities of the member 49. A supporting member 53 is also mounted on the bars 47 and 48 by means of a plurality of screws 54. This member is provided with an offset or shoulder portion 55 in which is set a dial 56 on which is inscribed the time indicating indicia 57 and any other inscriptions which may be desired. The dial member 56 is held in position by means of a plurality of clips 58. The central portion of the dial member 56 may be clear or transparent, but preferably, as in the embodiment of the invention illustrated, the central portion of the dial is colored so as to be translucent with the exception of the opaque indicia inscribed thereon. The outer portion of the dial is provided with any desired translucent color distinctive from that of the central portion and has inscribed thereon any appropriate indicia 59 such as advertising matter and the like.

The hands 61 and 62 are mounted adjacent the extremities of arbors 63 which extend forwardly from the clock mechanism 12 through suitable openings formed in the reflecting member 49 and the dial 56. The cover 64 forms the major portion of the case of the clock and is provided with an annular flange 65 which is fitted into the opening provided in the bead 45. An aligning member 66 is affixed to the back plate 43 adjacent the top thereof and projects forwardly therefrom. A hole is formed in the projecting portion of the member 66 and is adapted to receive a pin 67 attached to the cover 64. The cover is fastened in position by means of a screw 68 and a cooperating nut 69. A crystal 71 is mounted in the front part of the cover 64 by means of suitable retaining members.

The construction of the clock case and cover is such that the instrument is made watertight and hence renders the clock available for out-of-doors installations. Also by making the major portion of the clock case in the form of a removable cover, it is only necessary to remove this cover whenever adjustments or other servicing is to be effected. It will be seen that once the cover is removed, access is provided to practically every part of the clock mechanism and the illuminating devices without necessitating any further dismantling of the clock.

As viewed by an observer, the illuminated portion of the clock is made visible by means of light all of which is transmitted through the various areas of the dial which are translucent but not transparent. Furthermore the source of the light is completely hidden from view. Also, as in previously described modifications, the illumination of the clock face is made substantially uniform by means of the peculiar configuration of the reflecting member.

Although the invention has been illustrated and described in connection with what at present are considered to be preferred embodiments, it is apparent that various changes and modifications may be made therein without departing from the spirit of the invention or the scope of the appended claims.

What is claimed is:

1. In a clock, a pair of indicating hands, a pair of concentrically arranged shafts extending from the mechanism of said clock and supporting at their extremities said hands, a concavely curved light reflective surface interposed between said mechanism and said hands and having an apex adjacent the extremities of said shafts and an outer edge in a plane disposed rearwardly from said apex, a crystal disposed forwardly of said hands and provided with an annular translucent area adjacent its outer edge and a centrally disposed transparent area, said areas being mutually distinct in color with said translucent area having inscribed thereon indicia, and an annular source of light disposed in a plane between said surface and said crystal to produce a silhouetted effect upon said indicia.

2. In a clock, a pair of indicating hands, a pair of concentrically arranged shafts extending from the mechanism of said clock and supporting at their extremities said hands, a light reflective surface interposed between said mechanism and said hands, said surface having a centrally disposed apex forwardly spaced from said mechanism and generated by rotating about an axis extending through said apex an element conforming to a preselected portion of a parabolic curve, the outer edge of said surface being disposed in a plane adjacent said mechanism, and a source of light forwardly spaced from a portion of said reflective surface and arranged to encircle said shafts.

3. In a clock, a pair of indicating hands, a pair of concentrically arranged shafts extending from the mechanism of said clock and supporting at their extremities said hands, a light reflective surface interposed between said mechanism and said hands, said surface having an apex adjacent the extremities of said shafts and generated by rotating about an axis extending through said apex an element conforming to a preselected portion of a parabolic curve, the outer edge of said surface being disposed rearwardly from said apex, a translucent dial disposed adjacent said hands and having inscribed thereon opaque indicia, and an annular source of light disposed between said surface and said dial whereby said indicia are silhouetted against a uniformly illuminated background comprising said translucent dial.

4. In a clock, a pair of indicating hands, a pair of concentrically arranged shafts extending from the mechanism of said clock and supporting at their extremities sadi hands, a dial disposed adjacent to and rearwardly of said hands and bearing thereon indicia, a light reflective surface interposed between said mechanism and said dial, said surface having an apex adjacent said dial and generated by rotating about an axis extending through said apex an element conforming to a preselected portion of a parabolic curve, an annular bezel extending around the face of said clock, a transparent crystal mounted in said bezel forwardly of said hands, and an annular source of light disposed behind said bezel in a plane between said dial and said mechanism.

PAUL J. HOWE.
CLEMENT H. WYSS, Jr.